US010746596B2

(12) United States Patent
Owen

(10) Patent No.: US 10,746,596 B2
(45) Date of Patent: Aug. 18, 2020

(54) PROBE OPTIC LIGHT SHIELDS

(71) Applicant: Harry Owen, Franklin, MI (US)

(72) Inventor: Harry Owen, Franklin, MI (US)

( * ) Notice: Subject to any disclaimer, the term of this patent is extended or adjusted under 35 U.S.C. 154(b) by 0 days.

(21) Appl. No.: 16/442,308

(22) Filed: Jun. 14, 2019

(65) Prior Publication Data

US 2019/0383662 A1    Dec. 19, 2019

Related U.S. Application Data

(60) Provisional application No. 62/686,209, filed on Jun. 18, 2018.

(51) Int. Cl.
*G01J 3/28* (2006.01)
*G01J 3/02* (2006.01)
*G01J 3/44* (2006.01)
*G02B 27/30* (2006.01)

(52) U.S. Cl.
CPC ............ *G01J 3/0205* (2013.01); *G01J 3/44* (2013.01); *G02B 27/30* (2013.01)

(58) Field of Classification Search
CPC .... G01J 3/02; G01J 3/28; G01J 3/2803; G01J 3/10; G01J 3/2823
USPC ...................................................... 356/326
See application file for complete search history.

(56) References Cited

U.S. PATENT DOCUMENTS

| 2002/0043651 | A1* | 4/2002 | Darrow ............... G01N 33/582 252/408.1 |
| 2005/0256650 | A1* | 11/2005 | Labarbe ............. G01N 21/6408 702/19 |
| 2011/0151507 | A1* | 6/2011 | van Walsem .......... C12M 21/02 435/41 |
| 2012/0080611 | A1* | 4/2012 | Jones .................... G01J 1/0242 250/458.1 |
| 2013/0102772 | A1* | 4/2013 | Eshima .................... G21G 1/10 536/28.2 |
| 2013/0135580 | A1* | 5/2013 | Hartung ................. A61B 3/107 351/204 |
| 2015/0011406 | A1* | 1/2015 | Rich .................... G01N 33/582 506/9 |
| 2017/0122915 | A1* | 5/2017 | Vogt ......................... C08K 5/11 |
| 2018/0038784 | A1* | 2/2018 | Marks ................ G01N 15/1425 |

* cited by examiner

*Primary Examiner* — Md M Rahman
(74) *Attorney, Agent, or Firm* — John G. Posa

(57) ABSTRACT

Spectroscopic probe light shields coupled to the end of an optical probe improve user safety, reduce unwanted stray light and enhance signal collection from a liquid or gaseous sample. Apertured inner and outer baffles with offset perforations allow a sample to flow through the baffles and past a counter-propagating focused or collimated excitation/collection beam. The spectroscopic probe may be a Raman or fluorescence probe, operating in the UV-visible or mid-IR region of the spectrum. The inner shield may include a retro-reflector to amplify light collection from the sample, or the inner shield may include a light absorber to reduce the intensity of a scattered excitation beam. One or both of the inner and outer shields may be cylindrical, and the apertures in the baffles may be slots, circles or other shapes. The baffle(s) may be adapted for temporary, permanent, or semi-permanent attachment to the distal end of the probe optic.

19 Claims, 6 Drawing Sheets

PROBE OPTIC LIGHT SHIELDS

REFERENCE TO RELATED APPLICATIONS

This application claims the priority and benefit of U.S. Provisional Patent Application Ser. No. 62/686,209, filed Jun. 18, 2019, the entire content of which is incorporated herein by reference.

FIELD OF THE INVENTION

This invention related generally to spectroscopy and, in particular, to light shields with baffles configured for mounting to the end of an optical probe for improved user safety and reduced unwanted stray light to enhance signal collection.

BACKGROUND OF THE INVENTION

Techniques such as Raman and fluorescence spectroscopy use a beam of light to identify molecular constituents of a sample. Raman, for example, relies on inelastic scattering of monochromatic light, usually from a laser in the visible, near infrared, or near ultraviolet range of the spectrum.

Many Raman and fluorescence systems now use remote probes, wherein the laser excitation and collected spectra are carried over optical fibers to and from a probe head. The lasers used in these and other spectroscopic techniques are high-powered units, the light of which can be dangerous to the unprotected eye.

Current practice to protect the user from unwanted reflected laser light, and to keep a Raman probe from collecting unwanted external light, is to encase the reactor in foil and/or switch off all the lights close to the reactor. FIGS. 1A, B illustrate schematic installations for Raman and other optical probe sensors. Those of skill in the art would appreciate that a more robust solution is warranted.

SUMMARY OF THE INVENTION

This invention resides in spectroscopic probe light shields configured for coupling to the end of an optical probe for improved user safety and reduced unwanted stray light for a stronger signal to be collected. The shields are adapted for use with spectroscopic probes designed to direct a counter-propagating, excitation/collection light beam into a liquid or gaseous sample. In the preferred embodiments, shields according to the invention include inner and outer baffles, each with apertures that allow the sample to flow through the baffles and past the counter-propagating excitation/collection beam. The apertures of the baffles are preferably offset, such that counter-propagating excitation/collection beam cannot leave the shield and extraneous, ambient light cannot pass through both baffles and into the sample point or volume.

The spectroscopic probe may be a Raman or fluorescence probe, operating in the UV-visible or mid-IR region of the spectrum. The inner shield may include a retro-reflector to amplify light collection from the sample, or the inner shield may include a light absorber to reduce the intensity of a scattered excitation beam.

One or both of the inner and outer shields may be cylindrical, and the apertures in the baffles may be slots, circles or other shapes. The baffle(s) may be adapted for temporary, permanent, or semi-permanent attachment to the distal end of the probe optic. The counter-propagating, excitation/collection light beam may be focused or collimated in the sample.

DETAILED DESCRIPTION OF THE INVENTION

This invention is directed to attachments or accessories configured for use with most existing commercial Raman or fluorescence optical probes. The invention is not limited in terms of the wavelength regime, and may be used from the ultraviolet to infrared region of the spectrum, including near-IR (NIR), mid-IR and visible.

The invention assumes an existing probe optic that locates counter-propagating excitation and collection light in a sample, with a beam that may be collimated or focused. Optical probes that integrate laser excitation and collection beams are well known in the art, as described, by way of example, in U.S. Pat. No. 5,377,004, "REMOTE OPTICAL MEASUREMENT PROBE," incorporated herein by reference. The invention may be used with any gaseous or liquid samples, regardless of viscosity, including "slurries," for example.

In broad and general terms, the invention provides for a "probe optic light baffle" at the end of an optical probe for improved user safety and reduced unwanted stray light for a stronger signal to be collected. The apparatus allows the liquid (or gas) within a reactor to flow through the Raman/fluorescence collection zone at the end of an immersion probe end optic while, at the same time, eliminating a direct unwanted outward path for the laser and a direct unwanted inward path of outside light.

Figure 1A:
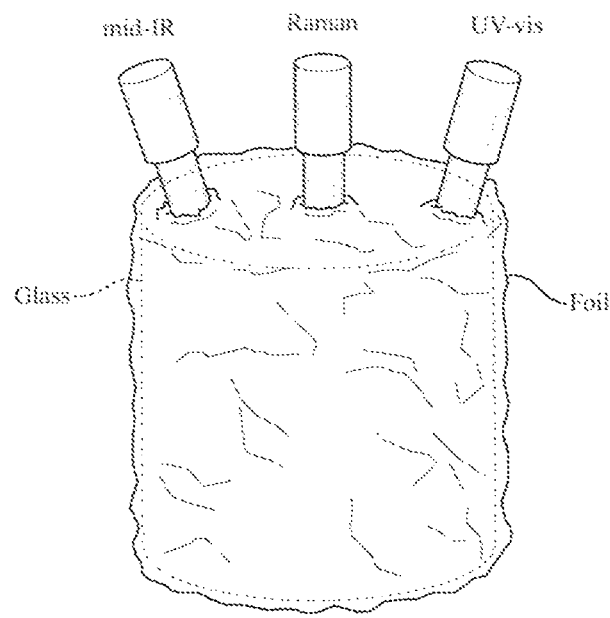
FIG. 1A is a schematic illustration showing how current practice uses aluminum foil to shield probes in a glass reactor vessel.
Figure 1B:
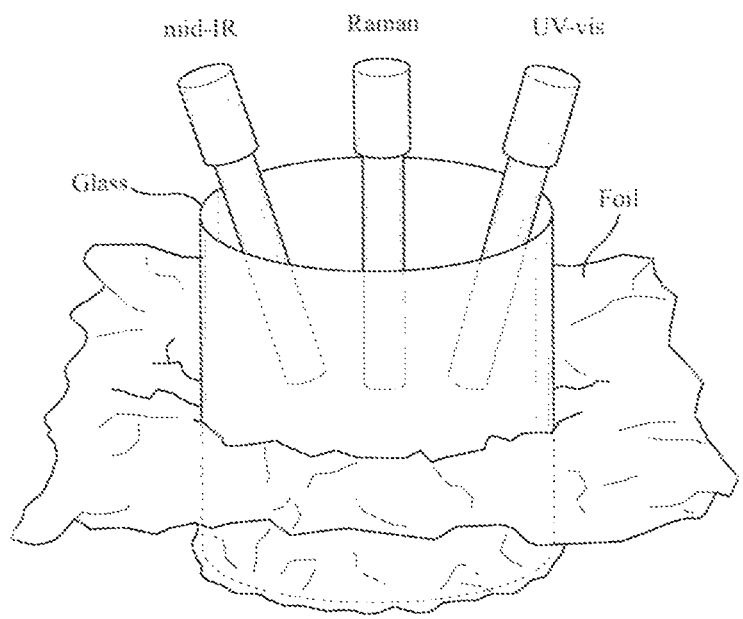
FIG. 1B shows the arrangement of FIG. 1A with the foil opened to show the distal ends of the probes.
Figure 2A:
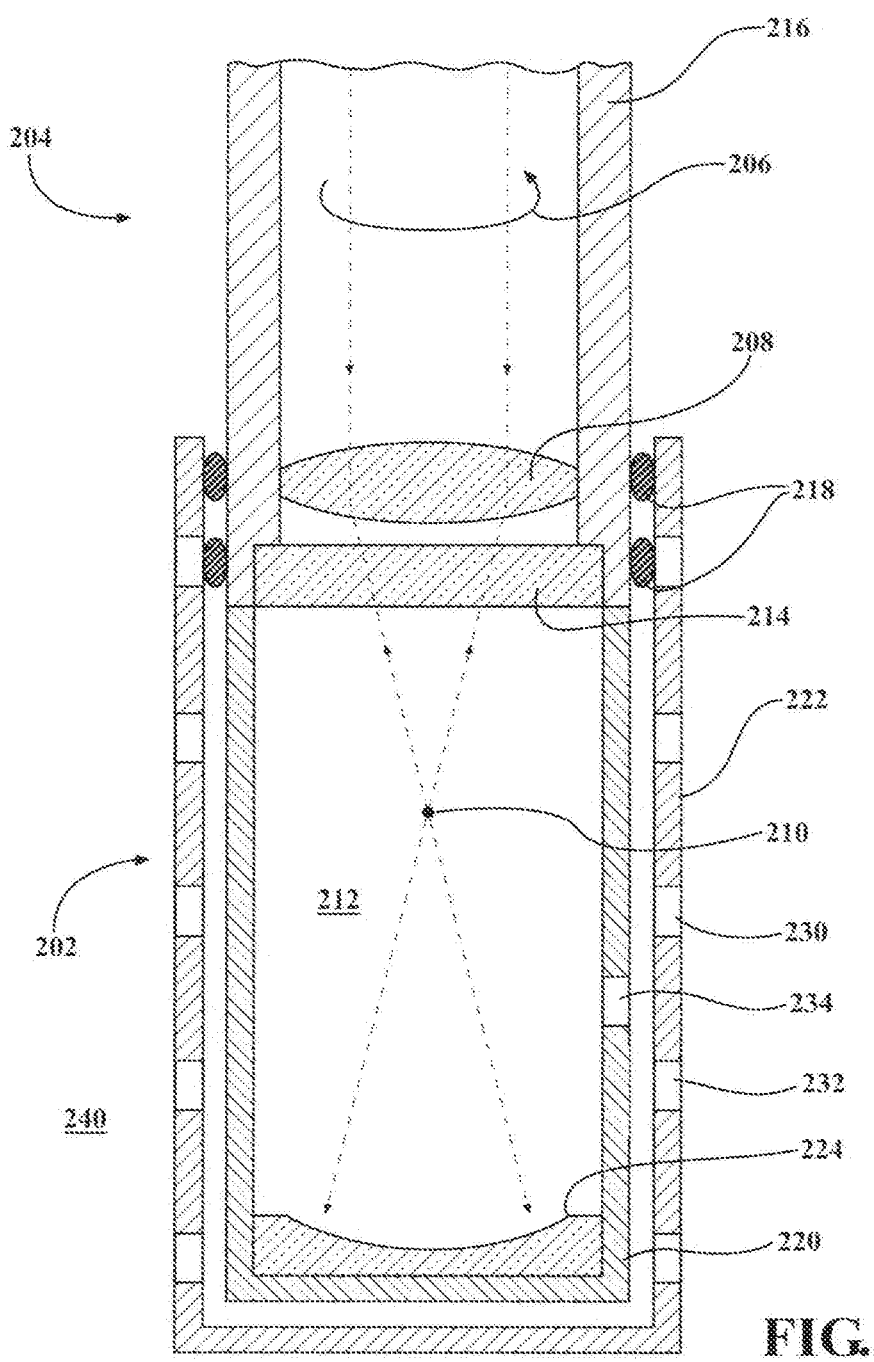
FIG. 2A is a drawing in cross section that illustrates an embodiment of the invention wherein at least two cylinders are sealed around a probe optic to operate as a removable baffle adapted to focused laser designs.
Figure 2B:
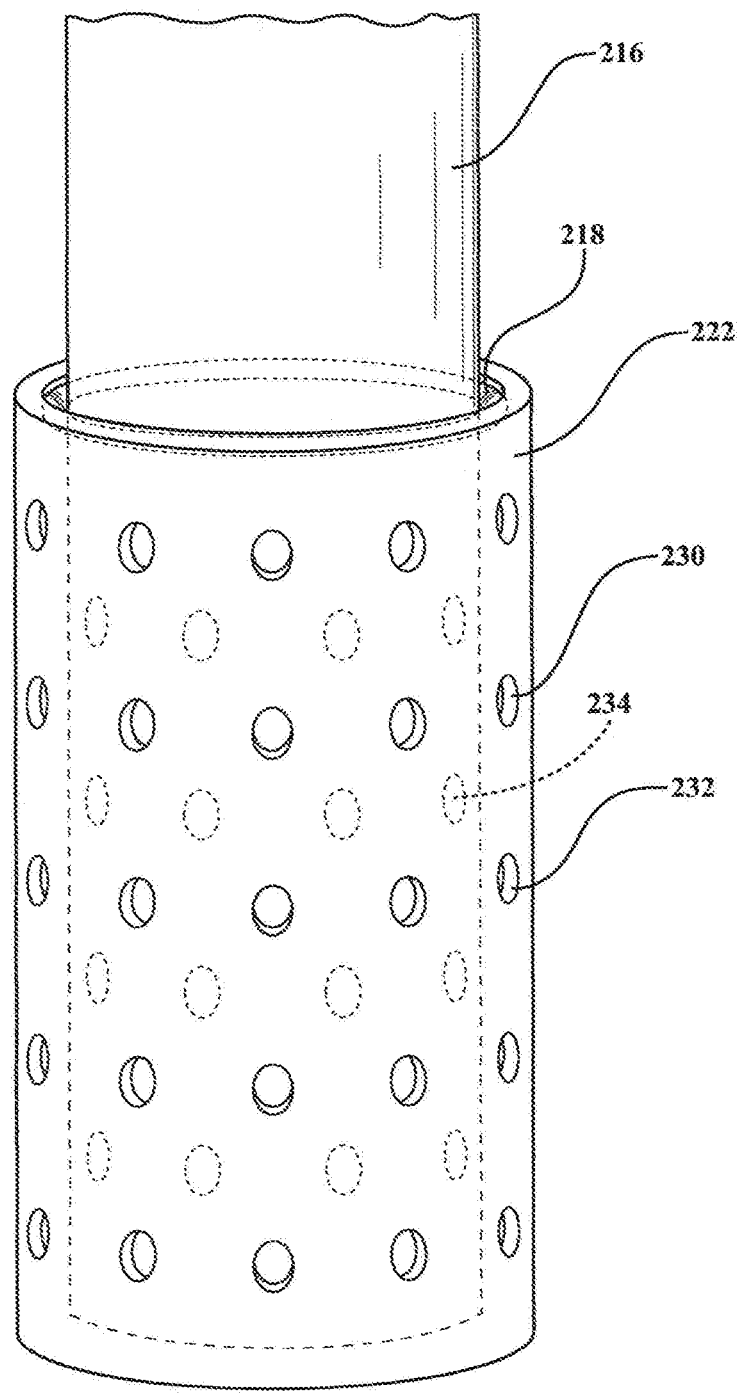
FIG. 2B is a perspective view of the shields of the embodiment of FIG. 2A showing how the perforations between the baffles are not aligned.

FIGS. 2A-B illustrate one preferred embodiment according to the invention, wherein light shield 202 removably attaches to an existing probe optic 204. Commercially available immersion probe optics have diameters ranging from ⅛" to 2", with lengths of up to 24" for laboratory reactors. The common materials used to construct the probe body are stainless steel 326L and 276. The baffle attachments disclosed herein would be engineered to suit these dimensions.

In FIG. 2A, the collimated, counter-propagating excitation/collection beam is focused by at least one optical element 208 to establish a focus point 210 in a sample 212. The light transferred to and from the probe optic through a window 214 sealed to a probe body 216. For example, the window may be sapphire window sealed to a stainless steel cylindrical probe body.

To allow the sample to flow through the optical collection volume and eliminate direct unwanted outgoing and ingoing paths for both the laser/light source and outside lights, a combination of at least two perforated baffles, preferably cylindrical, are sealed around the probe optic using push-on seals or other types of sealing arrangements. For example, multiple O-rings 218 constructed of, or coated with, an inert material such as Kalrez® or Viton® may be used.

FIG. 2A is a drawing in cross section that illustrates how inner and outer cylinders 220, 222, are sealed around the body 216 of probe optic 204 to operate as a removable light shield adapted to focused laser designs. If the excitation/collection beam is focused; i.e., at point 212, the inner, distal surface of the baffle includes an optical element 224 that acts as a retro-reflector and Raman/fluorescence signal amplifier by re-focusing the diverging beam from sample point 210 back up through the window 214 and into the probe head and spectrometer (not shown). Optical element 224 may, for example, be a curved mirror.

Figure 3A:
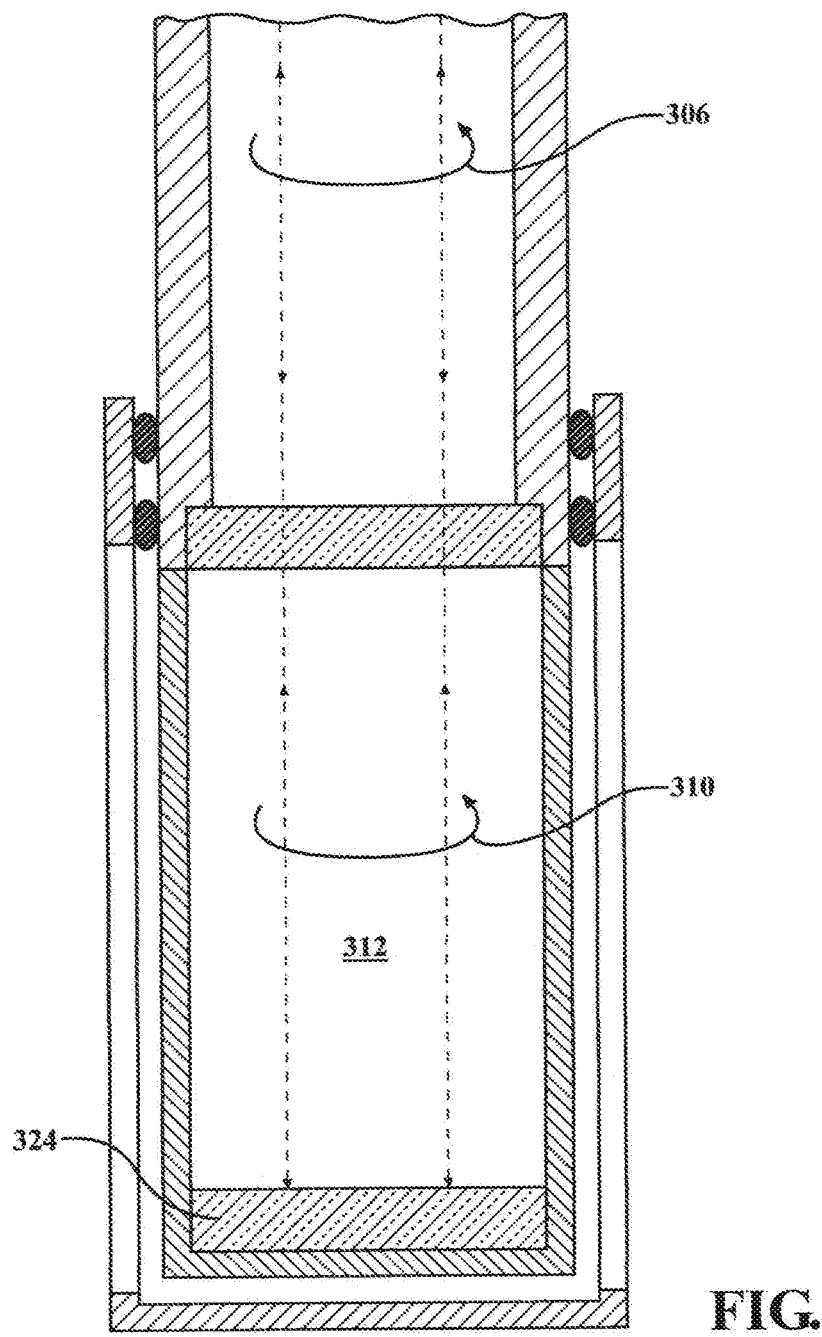
FIG. 3A is a drawing in cross section that illustrates an embodiment of the invention wherein at least two cylinders are sealed around a probe optic to operate as a removable baffle adapted to non-focused laser designs.
Figure 3B:
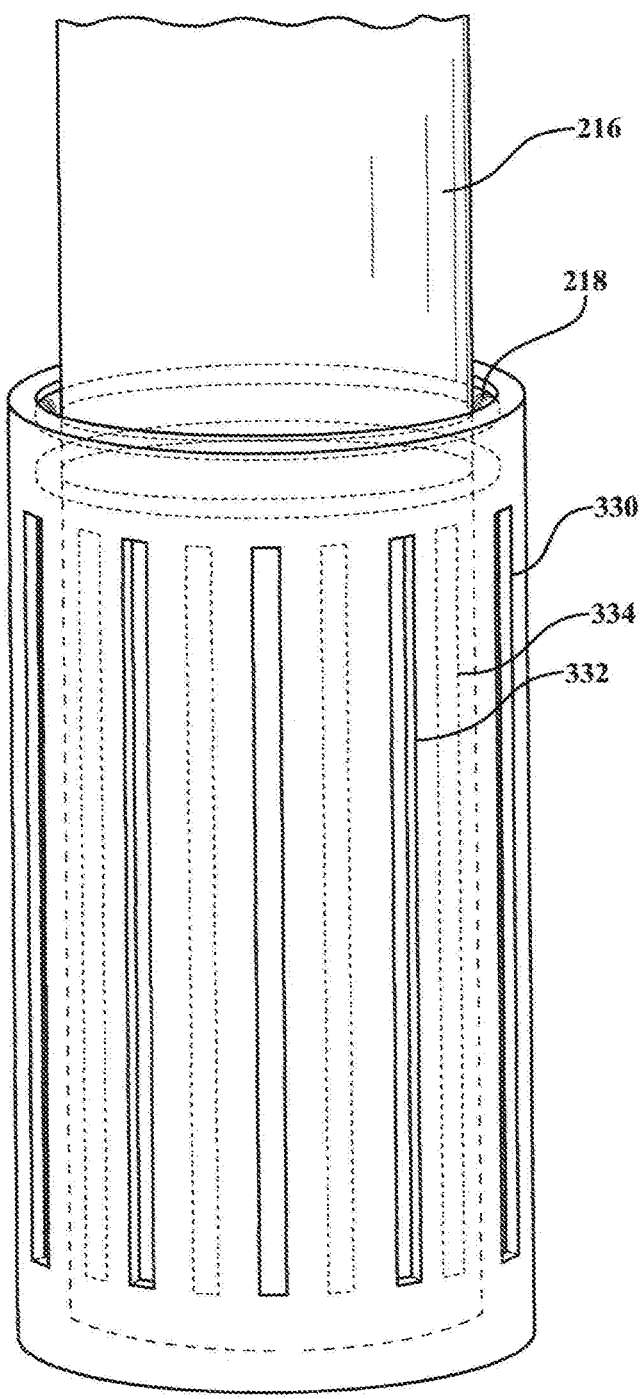
FIG. 3B is a perspective view showing how slots between the baffles are not aligned.

The perforations of the inner and outer baffles 220, 222 may be circles, as best seen in FIG. 2B, or other shapes such as slots, as shown in FIG. 3B. The cross sectional view of FIG. 2A shows two circular perforations 230, 232 in the inner baffle 220, and one circular perforation 234. Note that these holes are "misaligned" so that light rays cannot exit from within the sample volume 212 while also substantially elimination stray light from the surrounding ambient environment 240 from interfering with the collection of scattered light from sample point 210.

This intentional misalignment of apertures is perhaps better seen in FIGS. 2B and 3B which uses slots 330, 332 in the outer baffle, and slots 334 in the inner baffle. Note that in these drawings, the sizes and shapes of the perforations are not necessarily to scale. In practice, the viscosity or flow characteristics of the reactant can be considered, and the pattern and size of the open apertures may be adjusted accordingly. Indeed, different sizes and shapes may be used depending upon the circumstances; i.e., larger perforations may be used in the outer baffle; the outer baffle may use slots while the inner baffle uses holes, and so on. Regardless of size or shape, the apertures of the inner baffle are offset from the apertures of the outer baffle to eliminate direct outgoing light paths from the laser and direct ingoing paths penetrating through the shield from the surrounding environment.

FIG. 3A shows that the counter-propagating excitation-collection beam 306 need not be focused within a sample, but may remain collimated (310) through the sample volume 312. If this is the case, the optical element 324 used as a retro-reflector and Raman/fluorescence signal amplifier 324 may be a flat mirror.

Figure 4:
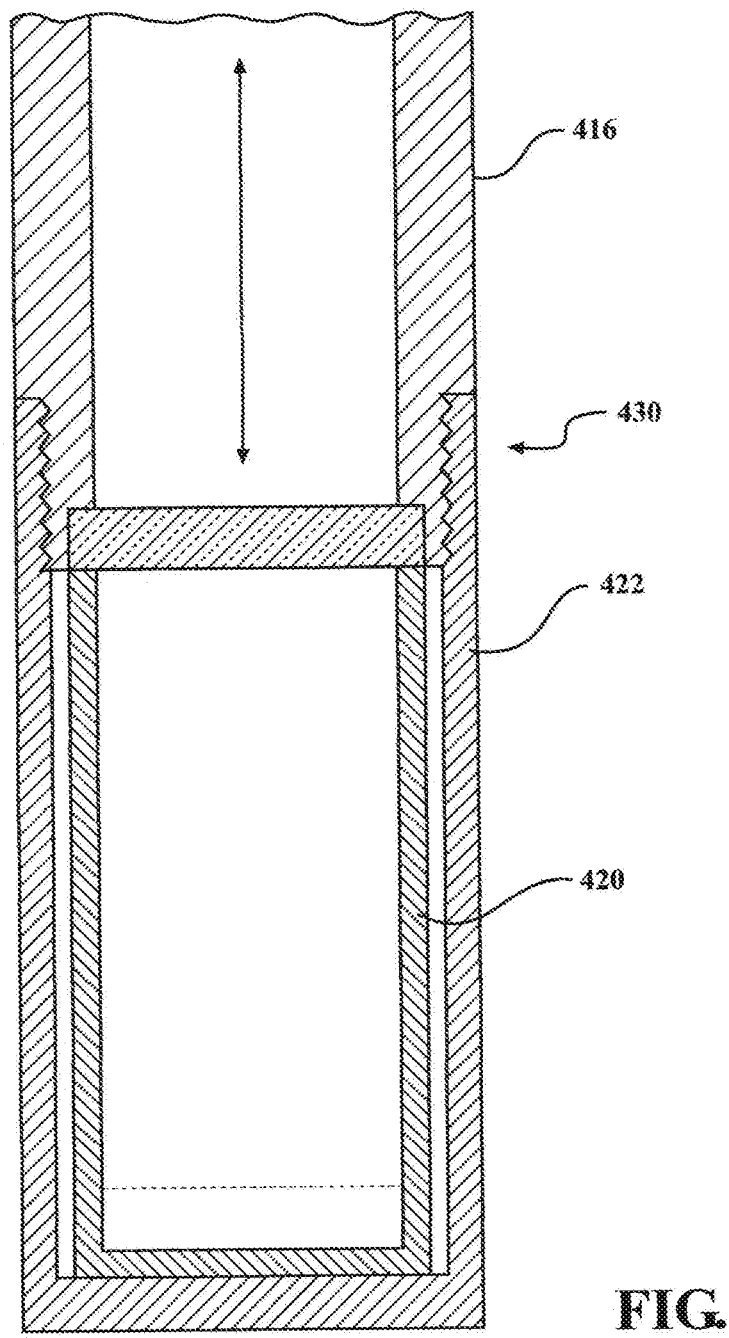
FIG. 4 is a drawing in cross section that illustrates an embodiment of the invention wherein one or more baffles are attached to an immersion probe optic with a screw-on fitting or a more permanent attachment.

FIG. 3A also shows a removable probe baffle attached to the immersion probe optic by a combination seals, for example, as a temporary push-on accessory. However, as an alternative, a more integrated probe baffle coupling may be used, as illustrated in FIG. 4. In this embodiment, the outer baffle 422 may be threaded at 430 to the end of the probe optic 416. The inner baffle may be dropped into the outer baffle or attached to the outer baffle. As a further alternative, both the inner and outer shields may screw onto the probe optic. Other coupling mechanism may be used, including set screws, and the like, as well as permanent attachment through welding, for example.

By way of review, any number of inner and outer baffles may be used, with perforations of any shape, with collimated or focused beams, used for Raman or fluorescence spectrography based upon any suitable excitation wavelength(s). The baffles may be constructed of any appropriate process-inert material(s) such a stainless steel. The attachment of the baffle(s) to the probe optic may be temporary, semi-permanent, or permanent. A disposable version of the baffle system may be provided as an option to avoid cleaning the baffle(s) between experiments. A retro-reflector may be provided within the inner baffle to amplify or improve the low-intensity Raman (or fluorescence) signals. Additional reduction in the scattered laser light can be obtained by placing a laser-absorbing insert in place of a retro-reflector in any of the embodiments described herein.

The invention claimed is:

1. An apparatus adapted for use with a spectroscopic probe directing a counter-propagating excitation/collection light beam into a liquid or gaseous sample, the apparatus comprising:
   a shield that fits over the end of the probe;
   wherein the shield includes an inner and outer baffles, each with apertures that allow the sample to flow through the baffles and past the counter-propagating excitation/collection beam; and
   wherein the apertures of the baffles are offset, such that counter-propagating excitation/collection beam cannot leave the shield and extraneous, ambient light cannot pass through both baffles.

2. The apparatus of claim 1, wherein the spectroscopic probe is a Raman or fluorescence probe.

3. The apparatus of claim 1, wherein the spectroscopic probe is a UV-visible or mid-IR probe.

4. The apparatus of claim 1, wherein the inner shield includes a retro-reflector to amplify light collection from the sample.

5. The apparatus of claim 1, wherein the inner shield includes a light absorber to reduce the intensity of a scattered excitation beam.

6. The apparatus of claim 1, wherein one or both of the inner and outer shields are cylindrical.

7. The apparatus of claim 1, wherein the apertures are slots, circles or other shapes.

8. The apparatus of claim 1, including a mechanism for temporary, permanent, or semi-permanent attachment of the shield to the probe.

9. The apparatus of claim 1, wherein the counter-propagating excitation/collection light beam is focused in the liquid or gaseous sample.

10. The apparatus of claim 1, wherein the counter-propagating excitation/collection light beam is collimated in the liquid or gaseous sample.

11. An apparatus adapted for use with a spectroscopic probe having an end from which a counter-propagating excitation/collection beam of light on an optical axis extends into a liquid or gaseous sample, the apparatus comprising:
   a shield that fits over the end of the probe;
   wherein the shield includes an inner enclosure with a distal surface aligned with the axis of the counter-propagating excitation/collection beam of light;
   an outer enclosure that fits over the inner enclosure;
   wherein both of the enclosures include apertures that allow the sample to flow through the enclosures and past the counter-propagating excitation/collection beam; and wherein the apertures of the inner and outer baffles are offset, such that light cannot enter or leave the inner enclosure.

12. The apparatus of claim 11, wherein the spectroscopic probe is a Raman or fluorescence probe.

13. The apparatus of claim 11, wherein the spectroscopic probe is a UV-visible or mid-IR probe.

14. The apparatus of claim 11, wherein the distal surface of the inner enclosure includes a retro-reflector to amplify light collection from the sample.

15. The apparatus of claim 11, wherein the distal surface of the inner enclosure includes a light absorber to reduce the intensity of the scattered excitation beam.

16. The apparatus of claim 11, wherein the apertures are slots, circles or other shapes.

17. The apparatus of claim 11, including a mechanism for temporary, permanent, or semi-permanent attachment of the shield to the probe.

18. The apparatus of claim 11, wherein the inner and outer enclosures are cylindrical, and the axis of the counter-propagating beam is aligned with the axis of the cylinders.

19. The apparatus of claim 18, wherein the apertures of the inner and outer enclosures are such that no straight line can be drawn radially inwardly or outwardly that passes through both an aperture in the inner enclosure and an aperture in the outer enclosure.

* * * * *